(12) United States Patent
Huttenlocher

(10) Patent No.: US 9,802,547 B2
(45) Date of Patent: Oct. 31, 2017

(54) VARIABLE STRUCTURAL-MEMBER COVERING

(71) Applicant: Magna Exteriors GmbH, Sailauf (DE)

(72) Inventor: Marc Huttenlocher, Nuertingen (DE)

(73) Assignee: MAGNA Exteriors GmbH, Sailauf (DE)

( * ) Notice: Subject to any disclaimer, the term of this patent is extended or adjusted under 35 U.S.C. 154(b) by 22 days.

(21) Appl. No.: 14/994,339

(22) Filed: Jan. 13, 2016

(65) Prior Publication Data

US 2016/0200259 A1 Jul. 14, 2016

(30) Foreign Application Priority Data

Jan. 13, 2015 (DE) .................. 10 2015 200 369

(51) Int. Cl.
| | | |
|---|---|---|
| *B60R 9/00* | (2006.01) | |
| *B60R 11/04* | (2006.01) | |
| *B60R 19/48* | (2006.01) | |
| *B60R 11/02* | (2006.01) | |

(52) U.S. Cl.
CPC ............... *B60R 9/00* (2013.01); *B60R 11/04* (2013.01); *B60R 19/483* (2013.01); *B60R 2011/0294* (2013.01)

(58) Field of Classification Search
CPC .......... B60R 19/483; B60R 11/04; B60R 9/00
USPC ............... 296/1.08; 293/4; 348/148
See application file for complete search history.

(56) References Cited

U.S. PATENT DOCUMENTS

| | | | | |
|---|---|---|---|---|
| 6,948,753 | B2 * | 9/2005 | Yoshida | B60R 13/04 296/1.08 |
| 2009/0122141 | A1 * | 5/2009 | Nakamura | B60R 11/04 348/148 |
| 2012/0200121 | A1 | 8/2012 | Wuerfel | |
| 2014/0347959 | A1 | 11/2014 | Hirakawa | |
| 2016/0107585 | A1 * | 4/2016 | Sugiura | B60R 11/04 296/1.08 |
| 2016/0258789 | A1 * | 9/2016 | Jeanton | G01D 11/30 |

FOREIGN PATENT DOCUMENTS

| | | |
|---|---|---|
| CN | 102627090 A | 8/2012 |
| CN | 102804912 A | 11/2012 |
| CN | 103384616 A | 11/2013 |
| DE | 102008016558 A1 | 10/2009 |
| DE | 102009026021 A1 | 12/2010 |
| DE | 102010045106 A1 | 3/2012 |
| DE | 102011000501 A1 | 8/2012 |

OTHER PUBLICATIONS

Office Action for Chinese Patent Application No. 201610006892.5, dated Jul. 31, 2017, 13 pages including 7 pages of English translation.

\* cited by examiner

*Primary Examiner* — Jason S Morrow
(74) *Attorney, Agent, or Firm* — Jordan IP Law, LLC; Todd A. Vaughn

(57) ABSTRACT

A structural member for an external region of a motor vehicle, the structural member exhibiting at least one receiving aperture for the reception of an electronic sensor for the external region. The structural member is to be sealed both with a cover without function, and with a support for the electronic sensor. Both the cover and the support being are to be introduced into a dovetail guide of the structural member.

20 Claims, 4 Drawing Sheets

VARIABLE STRUCTURAL-MEMBER COVERING

CROSS-REFERENCE TO RELATED APPLICATIONS

The present application claims priority 35 U.S.C. §119 to German Patent Publication No. DE 10 2015 200369.8 (filed on Jan. 13, 2015), which is hereby incorporated by reference in its complete entirety.

TECHNICAL FIELD

Embodiments relate to a structural member for an external region of a motor vehicle, the structural member exhibiting at least one receiving aperture for the reception of an electronic sensor for the external region. The structural member is to be sealed both with a cover without function, and with a support for the electronic sensor. Both the cover and the support being are to be introduced into a dovetail guide of the structural member.

BACKGROUND

Electronic cameras, night-vision systems, radar sensors etc. that have been arranged in the front radiator grille so as to be invisible or almost invisible from outside are used in modern motor vehicles for the purpose of registering the traffic situation. These cameras consist of an optical system as well as an image-recording device taking the form of a surface-mount chip with electronics connected downstream, so that the image signals can be supplied to evaluating electronics via appropriate wiring, usually via a coaxial cable.

Known camera systems are attached to the bodywork or to a mounting support via special brackets. The optical system of the camera is adjusted in such a way that the field of view to be registered passes through the structural apertures of the radiator grille, that is to say, no shading effects or visibility restrictions occur. However, the radiator grille exhibits a certain positional tolerance with respect to the bodywork or the mounting support. In order to guarantee an unrestricted acquisition of images, in known devices an adjustability of the camera or of the camera bracket about two or three axial directions is therefore necessary. However, with mounted radiator grille and bumper the associated adjusting screws and adjusting spindles are only accessible to a limited extent, if at all. Correspondingly, the adjustment of the camera system must, for example, be undertaken prior to the mounting of the bumper, in order to enable the adjusting screws concealed by this structural member to be accessed.

In the case of systems that cannot be corrected, or cannot be corrected about all the axes of adjustment, in the partly or fully mounted state of radiator grille and bumper, correspondingly larger receiving apertures for the optical system have to be provided as tolerance compensation. However, larger apertures in the radiator grille perturb the optical system or cannot be made compatible with existing styling. Of course, apertures are also bad for the drag coefficient, and should be avoided.

Accordingly, German Patent Publication No. DE 10 2012 214 26 A1 discloses a bracket is known taking the form of a plate which is attached to the inside of the radiator grille. For this purpose a clip-on joint, and in particular a screw joint, has been provided by means of self-tapping screws as well as single-thread nuts. The bracket exhibits an aperture, by means of which the acquisition of images by the camera system is effected.

German Patent Publication No. DE 10 2011 000 683 A1 a mounting unit with a camera is known which is prefabricated and then mounted in the vehicle.

The problem with this connection is always that the appearance of the joint for such inserted structural members is not satisfactory.

SUMMARY

Embodiments relate to a structural member with a support for an electrical sensor, or generally for an electrical component, that has an inconspicuous appearance of the joint.

Embodiments relate to a structural member for an external region of a motor vehicle, the structural member exhibiting at least one receiving aperture for the reception of an electronic sensor for the external region. The structural member is to be sealed both with a cover without function, and with a support for the electronic sensor. Both the cover and the support being are to be introduced into a dovetail guide of the structural member.

In accordance with embodiments, the dovetail guide guarantees that the receiving aperture has been sealed flush, either by the cover or by the support, along its longitudinal extent, and the components can be positively connected.

Advantageously, functional elements such as the support for an electrical component and also simple covers without function can be integrated, so that a formation of variants can be realized more easily.

It is an advantage that the cover or support has a trapezoidal shape and along its longitudinal sides exhibits grooves for the dovetail guide, with which it can be easily fitted into the structural member.

An advantage in this connection is that the cover or support exhibits along its longitudinal sides a guide edge which is set at an angle. This structural configuration permits a tight connection of the dovetail guides, so that the receiving aperture is snugly sealed.

The cover or support advantageously presents, on its narrow side, hooks for locking in recesses in the structural member. These hooks serve for pre-centring or actual centring of the cover or support in the structural member.

For the integration of a sensor, the support exhibits at least one opening towards the outside. For a plurality of electronic sensors, on the other hand, it is sufficient if the support exhibits at least one diminution of its thickness.

In this connection it is possible that the support receives a camera, a radar sensor, an infrared sensor or a light-generating means or a combination of the electrical components.

Advantageously, the cover and the structural member may be respectively composed of different synthetic materials. It is also possible to produce the cover from two-component synthetic material, in which case one component portion is transmitting in respect of radar beams, image-recognition etc., and only the transparent component is present along a sector of a circle.

DRAWINGS

Embodiments will be illustrated by way of example in the drawings and explained in the description below.

DESCRIPTION

Figure 1:
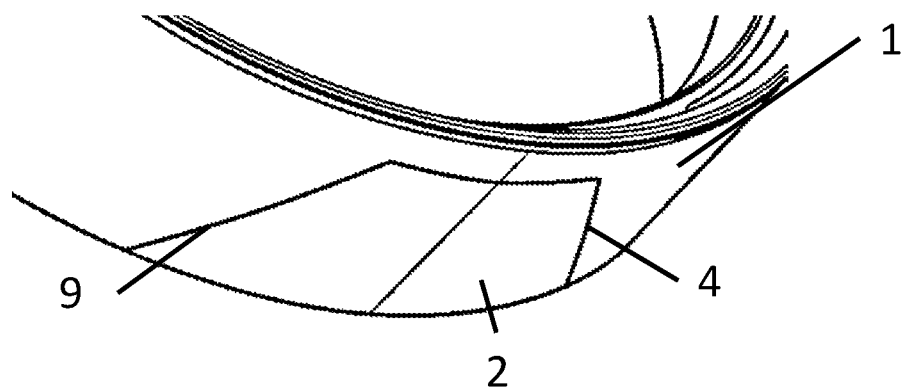
FIG. 1 illustrates a schematic representation of a structural member from outside, in accordance with embodiments.
Figure 2:
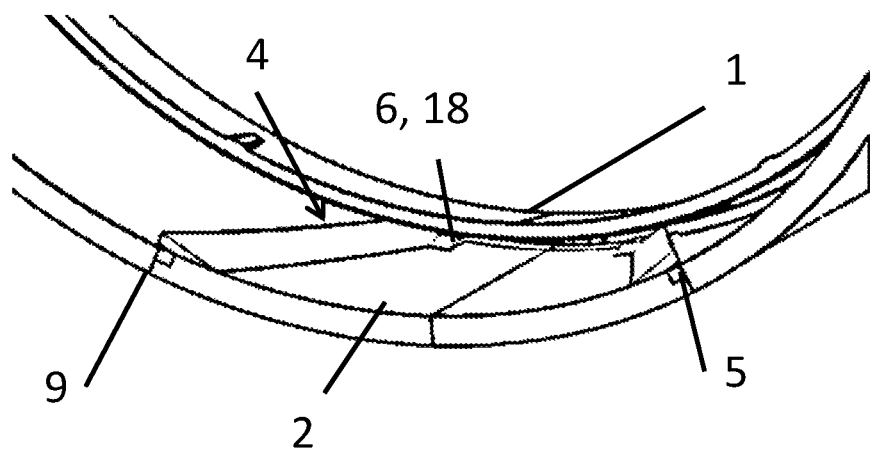
FIG. 2 illustrates a perspective of the structural member from inside, in accordance with embodiments.

As illustrated in FIGS. 1 and 2, a structural member 1 is provided in accordance with embodiments. In this case it is a question of a plastic structural member such as are used in a vehicle in the front and rear regions. For example, such a structural member may be a front module or rear module or a skirt or a fairing that has been produced from synthetic material.

In FIG. 1 a view of the structural member from outside is represented. A rounded shape of the structural member 1 includes a cover 2 inserted into a recess or receiving aperture 4 of the structural member 1. The cover 2 may have a trapezoidal shape which adapts itself to the shape of the outer contour and completely seals the receiving aperture of the structural member 1. In this case, the cover 2 follows the contour of the external surface of the structural member 1, and may be flat or may follow the curvature of the structural member 1. A terminating edge 9 of the cover 2 presents no gaps, and the structural member 1, together with the cover 2, creates the impression of a uniform exterior. In terms of design, a type of "shadow gap" may also be desired, this likewise being capable of being produced with the solution that has been described.

In FIG. 2 the structural member 1 is represented from the inside. The cover 2 will be discerned, which completely seals the receiving aperture 4.

Figure 3:
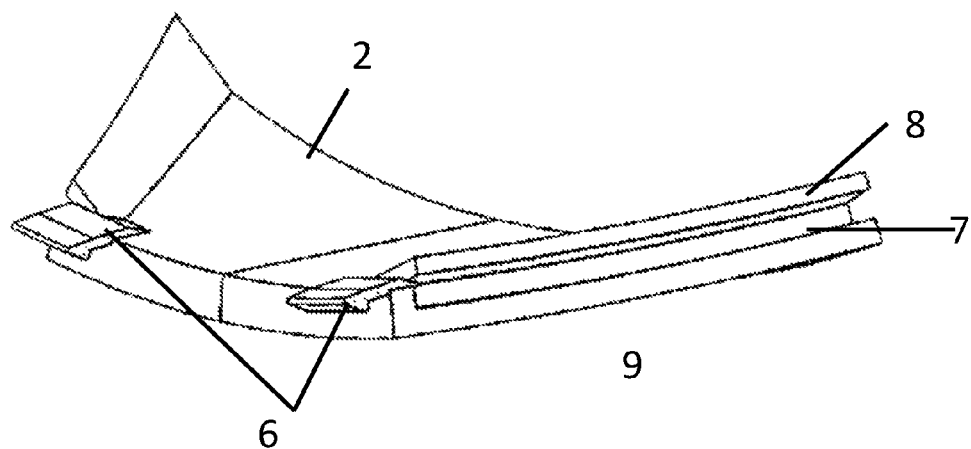
FIG. 3 illustrates a cover, in accordance with embodiments.
Figure 4:
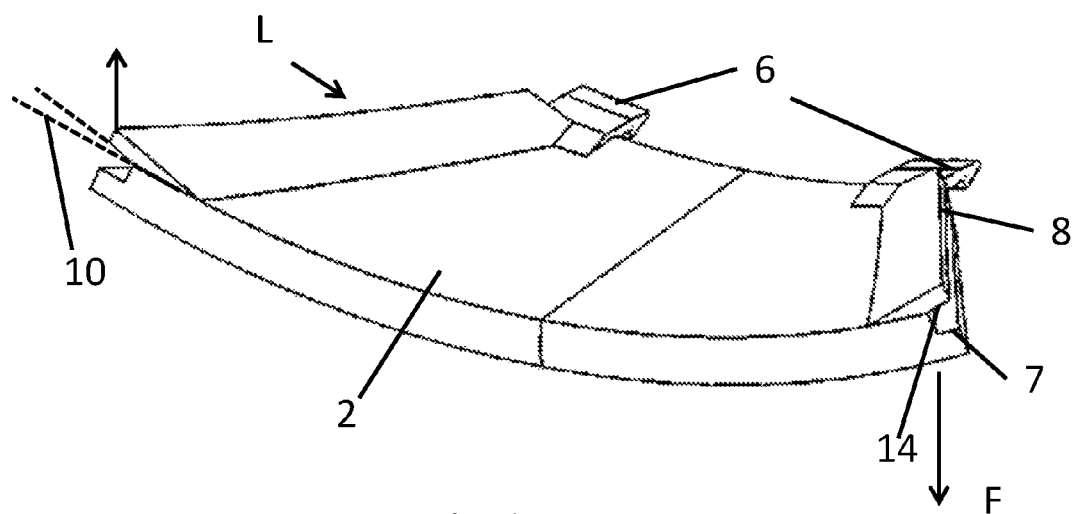
FIG. 4 illustrates a cover, in accordance with embodiments.

FIGS. 3 and 4 illustrates details of the cover 2, in accordance with embodiments. The cover 2 has on respective longitudinal sides L thereof a groove 7 in which a matching counterpart of the structural member 1 engages. In addition, in each instance a guide edge 8 extends along the longitudinal sides. The guide edge 8 takes the form of a structure extending away from the surface of the cover 2 at an angle 10. In this case a projection 14 which extends away from the groove 7 at a slight angle is formed in a region of the groove 7.

A dovetail guide 5 of the structural member 1 engages in the groove 7. The dovetail guide 5 includes a rib which may be dimensioned to be somewhat larger than would correspond to the height of the groove 7, so that when the cover 2 is introduced into the structural member 1, the guide edge 8 with its projection 14 is pushed upwards in the direction of the arrow. By virtue of the elasticity of the synthetic material, a force F is thereby exerted in the direction of the outside of the cover 2 and of the structural member 1. As a result, a better fit is obtained, and the edge 9 is sealed imperviously.

For further locking of the cover 2, and for its centering, hooks 6 may be provided which engage in suitable recesses 18 of the structural member 1. In accordance with embodiments, two hooks 6 are present, but is not limited thereto. For example, it may also be possible to fasten the cover 2 or a support 3 with one hook 6. Alternatively, the use of a plurality of hooks 6, or a fastening and centering with screws, pins and clips, is also possible.

The sealing of the structural member 1 with a cover 2 is only one variant if the customer or the manufacturer of the vehicle desires no functionalities at the position of installation. But the receiving aperture 4 may primarily serve to receive a support 3, the fastening and guidance of which in the structural member 1 are identical to those of the cover 2.

Figure 5:
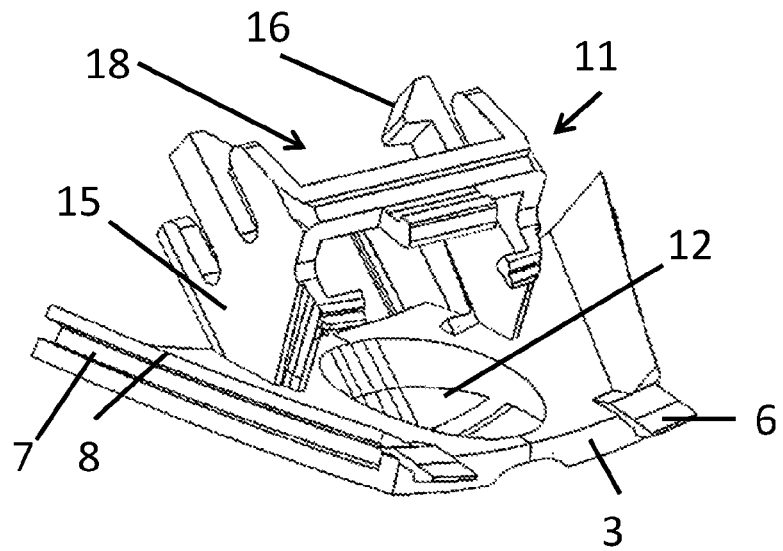
FIG. 5 illustrates a support with aperture, in accordance with embodiments.
Figure 6:
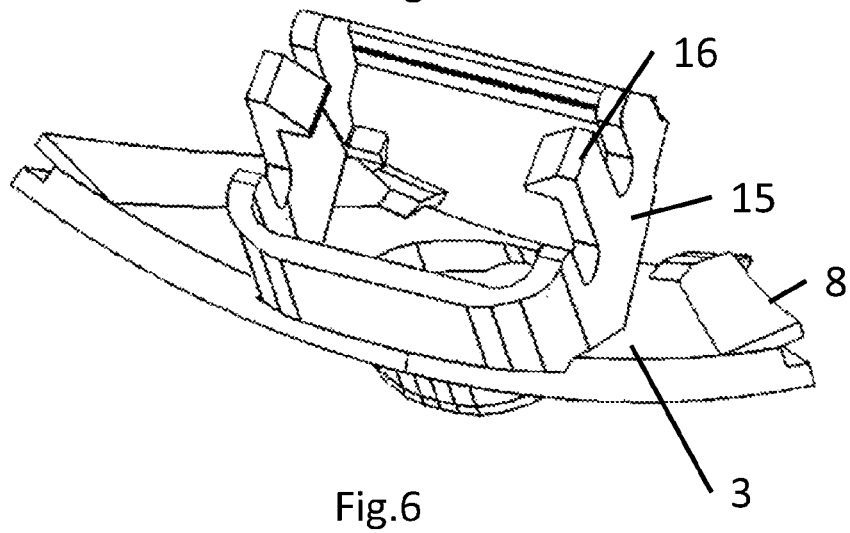
FIG. 6 illustrates a support with aperture, in accordance with embodiments.

As illustrated in FIGS. 5 and 6, in accordance with embodiments, the support 3 includes a bracket 11 with a frame structure 15 and clips 16. Via an opening 12 provided in the support 3, the objective of an electronic device or component such as, for example, a camera may pick up or receive electronic signals. The bracket 11 may be adaptable to the function and the requirements of the electrical device or component that is to be installed in the recess 4 of the structural member 1.

Varying sensors have been designated for the installation, such as optical sensors, that is to say, cameras or sensors in the non-visible region of the spectrum, such as radar sensors or infrared sensors. Ultrasonic sensors would also be possible electrical components. The sensors are preassembled and inserted into the frame structure or into a suitable bracket of the support 3.

The recess 4 of the structural member may also serve for receiving a light-generating device. The support then performs the function of an ambient illumination which has been provided for design reasons or for the reception of a functional light such as a turn-signal indicator and a daytime driving light, a surround-field luminaire, or a warning light. The combination of electrical components is also possible: accordingly, an active infrared illumination may have been arranged alongside a sensor, a light-generating means may be connected to an ultrasonic sensor, or a radar sensor may have been integrated into an ambient illumination.

Figure 7:
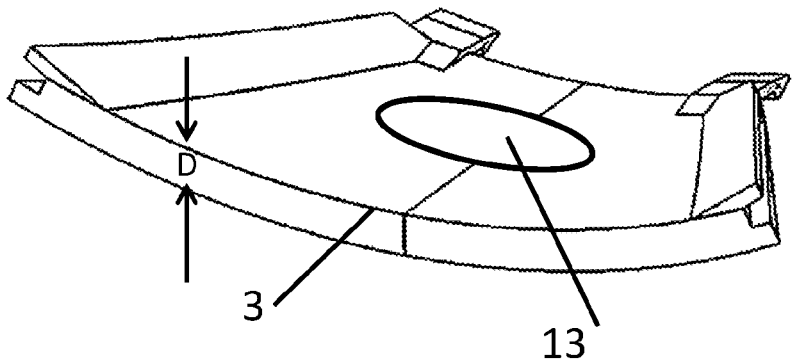
FIG. 7 illustrates a support with thickness diminution, in accordance with embodiments.

As illustrated in FIG. 7, in accordance with embodiments, the support 3 is not provided with an opening 12, but rather, the material of the support is designed to be thinner merely in the region 13 of a sensor or a light-generating device.

Figure 8:
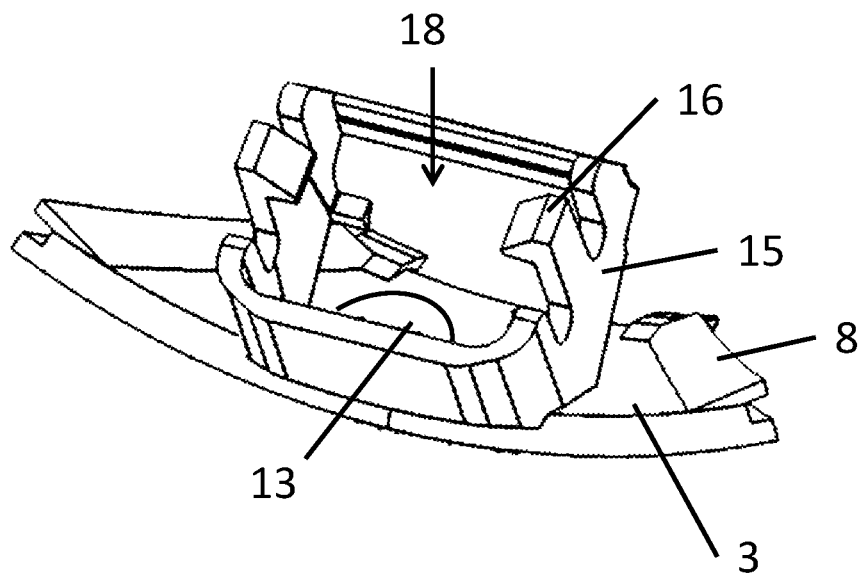
FIG. 8 illustrates a support with cover, in accordance with embodiments.

As illustrated in FIG. 8, the support 3 may consequently be sealed with a cover 2.

The thickness of the synthetic material of the support 3 with sealed cover 2 is chosen in such a way that stability is ensured but the signals for the sensor, for example, a radar sensor, are able to pass through the layer of synthetic material. The region of reduced thickness is chosen for the specific sensor. Starting from a thickness D of the support 3, a thickness d<D is chosen. Of course, brackets and clips for connecting to a sensor are also possible in accordance with embodiments.

As possible sensors, infrared sensors or radar sensors come into operation that are able to operate through suitable synthetic material if the latter does not attenuate too much. A light-source may also show through the synthetic material.

For the purpose of producing the cover 2 and/or the support 3 with or without cover, a synthetic material is chosen that either corresponds to the structural member 1 or simply is composed of a different synthetic material. For the functional structural member in this case, a material suitable for the application may be chosen that is transmitting in the spectral region of operation.

Figure 9:
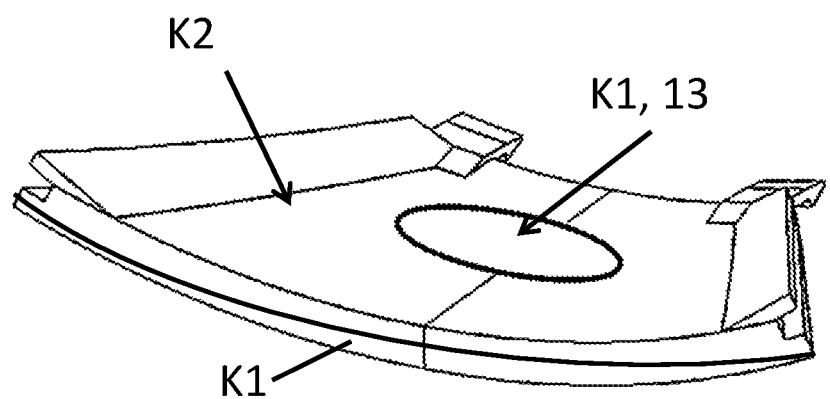
FIG. 9 illustrates a support as a 2-component structural member, in accordance with embodiments.

As illustrated in FIG. 9, in accordance with embodiments, a support with cover in a two-component injection-moulding process. In this case, one of the synthetic materials is transparent or semi-transparent for the respective application; the second component advantageously corresponds to the material of the structural member 1. The second component K1 constitutes, for example, the basis for the injection moulding, and forms a region 13 in which only the first component K1 is present. The second component K2 then exhibits a cavity in region 13. As an alternative to this, component K1 may also have been injected only in region 13. Hence the support may have been produced from material that corresponds to the material of the structural member 1 and that consequently exhibits the same thermal expansions.

By virtue of the solution that has been presented, varying functional structural members can be installed in a recess of a structural member of a vehicle, and hence a simple formation of variants can be produced. The structural members that have been described represent examples; the solution according to the invention can be employed widely by a person skilled in the art.

The term "coupled" or "connected" may be used herein to refer to any type of relationship, direct or indirect, between the components in question, and may apply to electrical, mechanical, fluid, optical, electromagnetic, electromechanical or other connections. In addition, the terms "first," "second, etc. are used herein only to facilitate discussion, and carry no particular temporal or chronological significance unless otherwise indicated.

This written description uses examples to disclose the invention, including the preferred embodiments, and also to enable any person skilled in the art to practice the invention, including making and using any devices or systems and performing any incorporated methods. The patentable scope of embodiments is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, may be mixed and matched by one of ordinary skill in the art to construct additional embodiments and techniques in accordance with principles of this application.

LIST OF REFERENCE SIGNS 1 structural member
2 cover
3 support
4 receiving aperture
5 dovetail guide
6 hook
7 groove
8 guide edge
9 terminating edge
10 angle
11 bracket
12 opening
13 reduced thickness
14 projection
15 frame structure
16 clips
D thickness
L longitudinal sides
17 electrical component
18 recesses for hooks
K1 first synthetic material
K2 second synthetic material

What is claimed is:

1. A structural member for an external region of a motor vehicle, the structural member comprising:
   a structural member body having:
      a dovetail guide;
      at least one receiving aperture to receive an electrical component for the external region; and
      and a support introduced into the dovetail guide to receive the electrical component;
   a cover introduced into the dovetail guide to seal the at least one receiving aperture.

2. The structural member of claim 1, wherein the cover or the support has a trapezoidal shape and along longitudinal sides thereof has grooves which correspond to the dovetail guide.

3. The structural member of claim 2, wherein the cover or the support has along longitudinal sides thereof a guide edge which is set at an angle.

4. The structural member of claim 1, wherein the cover or the support is to seal the structural member outwardly with a terminating edge or a shadow gap.

5. The structural member of claim 1, wherein the cover or the support exhibits, on a side thereof, hooks to lock in corresponding recesses of the structural member.

6. The structural member of claim 1, wherein the structural member is composed of a first material, and the cover is composed of a second material.

7. The structural member of claim 6, wherein the second material is transparent to a spectral region to be registered or emanating.

8. The structural member of claim 1, wherein the cover is produced from a two-component injection moulding.

9. The structural member of claim 1, wherein the support has at least one opening towards an outside thereof.

10. The structural member of claim 1, wherein the support has a second cover composed of a synthetic material that is transparent, in at least one region thereof, to a desired spectral region.

11. The structural member of claim 1, wherein the electronic component comprises a camera, a radar sensor, an infrared sensor, a light-source, or a combination thereof.

12. A motor vehicle, comprising:
   structural member for an external region of the motor vehicle, the structural member having a body with a dovetail guide, at least one receiving aperture to receive an electrical component for the external region, and a support to be introduced into the dovetail guide to receive the electrical component; and
   a cover to be introduced into the dovetail guide to seal the at least one receiving aperture.

13. The motor vehicle of claim 12, wherein the cover or the support has a trapezoidal shape and along longitudinal sides thereof has grooves which correspond to the dovetail guide.

14. The motor vehicle of claim 13, wherein the cover or the support has along longitudinal sides thereof a guide edge which is set at an angle.

15. The motor vehicle of claim 12, wherein the cover or the support exhibits, on a side thereof, hooks to lock in corresponding recesses of the structural member.

16. The motor vehicle of claim 12, wherein the structural member is composed of a first material, and the cover is composed of a second material transparent to a spectral region to be registered or emanating.

17. The motor vehicle of claim 12, wherein the support has a second cover composed of a synthetic material that is transparent, in at least one region thereof, to a desired spectral region.

18. The structural member of claim 12, wherein the electronic component comprises a camera, a radar sensor, an infrared sensor, a light-source, or a combination thereof.

19. A motor vehicle, comprising:
   structural member having a body with a dovetail guide, at least one receiving aperture to receive an electrical component, and a support to be introduced into the dovetail guide to receive the electrical component; and
   a cover having grooves along longitudinal sides thereof which are to be engaged by the dovetail guide to seal the at least one receiving aperture at an external region of the motor vehicle.

20. The structural member of claim 1, wherein the electronic component comprises a camera, a radar sensor, an infrared sensor, a light-source, or a combination thereof.

\* \* \* \* \*